United States Patent
Pongratz et al.

(10) Patent No.: US 9,300,866 B2
(45) Date of Patent: Mar. 29, 2016

(54) METHOD FOR IMAGE PROCESSING AND METHOD THAT CAN BE PERFORMED THEREWITH FOR THE AUTOMATIC DETECTION OF OBJECTS, OBSERVATION DEVICE AND METHOD FOR HIGH-PRECISION TRACKING OF THE COURSE FOLLOWED BY LAUNCHED ROCKETS OVER LARGE DISTANCES

(71) Applicant: Airbus Defence and Space GmbH, Ottobrunn (DE)

(72) Inventors: Hans Wolfgang Pongratz, Taufkirchen (DE); Manfred Hiebl, Neuberg a. d. Donau (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 0 days.

(21) Appl. No.: 14/435,020

(22) PCT Filed: Oct. 8, 2013

(86) PCT No.: PCT/DE2013/000569
§ 371 (c)(1),
(2) Date: Apr. 10, 2015

(87) PCT Pub. No.: WO2014/056473
PCT Pub. Date: Apr. 17, 2014

(65) Prior Publication Data
US 2015/0281572 A1    Oct. 1, 2015

(30) Foreign Application Priority Data

Oct. 12, 2012  (DE) .......................... 10 2012 020 104
Nov. 9, 2012  (GB) .......................... 10 2012 022 045

(51) Int. Cl.
*H04N 5/228* (2006.01)
*H04N 5/232* (2006.01)
(Continued)

(52) U.S. Cl.
CPC .......... *H04N 5/23229* (2013.01); *G06K 9/0063* (2013.01); *G06K 9/00214* (2013.01);
(Continued)

(58) Field of Classification Search
CPC .................................................. H04N 5/23229

USPC ....................................................... 348/222.1
See application file for complete search history.

(56) References Cited

U.S. PATENT DOCUMENTS

| 4,686,646 A | 8/1987 | Goutzoulis |
| 5,299,275 A | 3/1994 | Jackson et al. |

(Continued)

FOREIGN PATENT DOCUMENTS

| DE | 10 2011 010 337 A1 | 8/2012 |
| DE | 10 2011 010 339 A1 | 8/2012 |
| WO | WO 03/025836 A1 | 3/2003 |

OTHER PUBLICATIONS

International Search Report (PCT/ISA/210) dated Jun. 3, 2014, with English translation (eleven (11) pages).

(Continued)

*Primary Examiner* — Usman Khan
(74) *Attorney, Agent, or Firm* — Crowell & Moring LLP

(57) ABSTRACT

A method for image processing involves collecting image data of a scene as electromagnetic radiation and processing the image data to improve the signal-to-noise ratio of the image data. The image processing involves dividing a raw image that contains the image data into lines and columns, to create a raster image, superimposing a central raster filter element of a raster filter having an odd number of lines and an odd number of columns onto a raster image element, determining the brightness values of each of the raster image elements covered by the raster filter, wherein except for the central raster filter element, every other raster filter element has an individual light-reducing property, and adding up the brightness values to produce a total brightness value, and assigning this total brightness value to the raster image element covered by the central raster filter element. These image processing steps are repeated for all remaining raster image elements to produce a result image having the same resolution as the raw image from the total brightness values of the raster image elements.

11 Claims, 4 Drawing Sheets

(51) Int. Cl.
*G06T 5/00* (2006.01)
*G06T 5/20* (2006.01)
*G06K 9/00* (2006.01)
*G06K 9/32* (2006.01)
*G06T 7/00* (2006.01)
*G06T 7/40* (2006.01)

(52) U.S. Cl.
CPC .............. *G06K9/3241* (2013.01); *G06T 5/002* (2013.01); *G06T 5/20* (2013.01); *G06T 7/004* (2013.01); *G06T 7/408* (2013.01); *G06K 9/3275* (2013.01); *G06T 2200/28* (2013.01); *G06T 2207/10004* (2013.01); *G06T 2207/10036* (2013.01); *G06T 2207/30212* (2013.01)

(56) References Cited

U.S. PATENT DOCUMENTS

| | | |
|---|---|---|
| 2013/0329055 A1 | 12/2013 | Hiebl et al. |
| 2014/0022388 A1 | 1/2014 | Hiebl et al. |

OTHER PUBLICATIONS

German-language Written Opinion (PCT/ISA/237) dated Jun. 3, 2014 (sixteen (16) pages).

Robert Collins, "Lecture 4: Smoothing" http://www.cse.psu.edu/~rcollins/CSE486/lecture04.pdf, Jul. 17, 2010 (45 pages).

W. K. Pratt, "Digital Image Processing" 2007, pp. 298-299.

"Gaussian blur", Wikipedia, Sep. 29, 2012 (five (5) pages).

Michael A. Soel et al., "Multiview : a novel multispectral IR imaging camera", Proc. SPIE 3063, Infrared Imaging Systems: Design, Analysis, Modeling, and Testing VIII, vol. 239, Jun. 16, 1997, pp. 247-256.

David W. Paglieroni et al., "The Position-Orientation Masking Approach to Parametric Search for Template Matching", IEEE Transactions on Pattern Analysis and Machine Intelligence, vol. 16, No. 7, Jul. 1994, pp. 740-747.

METHOD FOR IMAGE PROCESSING AND METHOD THAT CAN BE PERFORMED THEREWITH FOR THE AUTOMATIC DETECTION OF OBJECTS, OBSERVATION DEVICE AND METHOD FOR HIGH-PRECISION TRACKING OF THE COURSE FOLLOWED BY LAUNCHED ROCKETS OVER LARGE DISTANCES

TECHNICAL FIELD

Exemplary embodiments of the present invention relate to a method for image processing, a method for automatic object recognition, and observation apparatuses.

BACKGROUND AND SUMMARY OF THE INVENTION

In the field of remote observation of objects, particularly during the course of military reconnaissance, it is important to track moving objects, for example launched rockets having firing engines, over a great distance of up to 1500 km and to at first detect rockets that have stopped firing, with sufficient, if applicable artificial illumination, over a distance of up to 1000 km, to track them along their movement path, and to identify them. Even if optical observation apparatuses having long focal length lenses and high-resolution image sensors are used, it is not possible to obtain high-resolution images reproducing the engine jet flame object with sharp focus within the range of a few meters at an object distance of more than 500 km to as much as 1500 km, because the brightness distribution within the jet flame fluctuates in all directions, at high frequency, in a range of up to 100 m. In spite of such reduced imaging performance, however, it must be possible to determine whether the detected object is a military or civilian launch vehicle or a decoy. Furthermore, it must be possible for object recognition to take place over a sufficient period of time, with a reliable result, at a precision of a few meters, in order to be able to measure the flight path of the object (for example, a rocket) from this process with such precision that stable tracking of the observation apparatus is possible, and that combating the flying object on its flight path can take place.

From the general state of the art, large X-band radar systems are known for such target tracking purposes, which systems must be stationed closely enough along an expected rocket route that they constantly have a flying rocket in their viewing field above the horizon. This not only requires great effort and expenditure, but is frequently also not sufficiently possible for political reasons. Furthermore, such radar stations can only determine the position of target objects and measure their radar reflection cross-section at a distance of 1000 km crosswise to the viewing direction, with a precision of several kilometers, but cannot undertake any precise identification. Decoys, in particular, can usually not be distinguished from true warheads by means of radar, and this causes great problems.

Furthermore, satellites in geostationary orbits are known from the state of the art, which can discover launched rockets in the medium infrared range, using telescopes. Because the discovery from above must take place against the warm earth background, with a great number of false targets that are difficult to recognize, these systems must battle against comparatively low sensitivity. On the basis of the observation from above, the sensor also sees only the less bright and fluctuating part of the engine flame. As a result, its measurement accuracy is limited to a few hundred meters, and cannot be significantly improved due to system limitations.

A camera system for detecting and tracking the path of moving objects situated at a great distance, from a high-flying aircraft that flies above the dense atmosphere, is known from German patent document DE 10 2011 010 337, which is not a prior publication.

This system has the great advantage of being able to observe the launched rockets practically outside the atmosphere, from below, against the background of cold outer space, and does not need to suppress any false targets, except for stars and close heavenly bodies, the position of which is precisely known, in order to prevent false alarms.

A further great advantage of observation from below and to the side of the flight path is that from there, the viewing direction onto the hot core region of the engine jet, which has a temperature above 2000° K, is clear directly at the jet outlet. This core region of the jet has a light density that is one hundred times greater than the jet farther away, and is firmly fixed in place at the jet outlet, in other words does not perform any fluctuations. As a result, an extremely bright (1 megawatt/m$^2$) light source point, a few meters in diameter, is available for tracking the flight path of the rocket, precisely and constantly.

Exemplary embodiments of the present invention are directed to a sensor that can locate this point light source over a distance of up to 1500 km, with a precision of a few meters, and follow it.

This can be achieved using a multi-spectral camera system for the near infrared range, which is detailed below. The multi-spectral camera can record multi-spectral images (e.g. at 700 nm, 800 nm, and 950 nm) of a scene sequentially, using a motor-driven filter wheel having at least three narrow-band (e.g. 20 nm) transmission filters. From this, a temperature image of the scene, with a resolution of 50° K, for example, can be calculated by means of conversion according to the black-body radiation laws. At this resolution, according to the invention, the hot core region of a solid-fuel rocket, having a temperature of approximately 2300° K, and its characteristic shape can be clearly differentiated from the hot core region of a liquid-fuel rocket, having a temperature of 2100° K, and a different shape, and with sufficient optical resolution of the camera from 1 m to 2 m, at a distance of 1000 km, the size of the core region and its temperature distribution can also be measured. With these data, military solid-fuel rockets can be differentiated from civilian liquid-fuel rockets, and different rocket types can be differentiated by the size, number, and arrangement of the engines.

This camera system has a camera provided with a lens having a long focal length, which camera is disposed on a position-stabilized platform. This camera is provided with a high-speed shutter as well as a first and a second image sensor. The light radiation captured by the camera lens can be optionally guided to the first or the second image sensor, with a further telephoto lens being assigned to one of the image sensors. The camera optics furthermore have a pivoting mirror, with which it is possible to scan a field line by line, by means of pivoting the mirror, with the captured image signal being passed to one of the image sensors. If a target object is recognized during this scanning process, the light beam is deflected to the other image sensor, which is then used for object identification and, if applicable, for target tracking.

Exemplary embodiments of the present invention are directed to a method for image processing, with which it is possible to process image data collected, even over great distances, for example several hundred kilometers, particularly at a distance of 100 km to 500 km, in such a manner that it is possible to recognize an object contained in the recorded scene by means of these processed image data, by means of the processed image data. Exemplary embodiments of the present invention are also directed to performing automatic object recognition using this method of image processing. Finally, exemplary embodiments of the present invention are directed to observation apparatuses with which these methods can be implemented.

An exemplary method according to the invention, equipped in this manner, has the following method steps:

a) collecting image data of a scene as electromagnetic radiation, such as light in the visible spectrum, in the infrared spectrum, or in the ultraviolet spectrum, for example, by means of an optical device;

b) processing the image data obtained in step a) by means of image processing, to improve the signal-to-noise ratio of the image data, wherein the processing is carried out in the following partial steps:

b1) dividing a raw image that contains the image data into lines and columns, to create a raster image;

b2) superimposing a central raster filter element of a raster filter having an odd number of lines and an odd number of columns onto a raster image element;

b3) determining the brightness values of each of the raster image elements covered by the raster filter, wherein except for the central raster filter element, every other raster filter element has an individual light-reducing property;

b4) adding up the brightness values determined in step b3) to produce a total brightness value, and assigning this total brightness value to the raster image element covered by the central raster filter element;

b5) repeating steps b2) to b4) for all remaining raster image elements;

c) producing a result image having the same resolution as the raw image from the total brightness values of the raster image elements obtained in step b).

By means of this image processing method according to the invention, the signal-to-noise ratio of the collected raw image is improved, in that the brightness progression of the raw image is filtered. Furthermore, noise pixels that emerge from the background of the raw image are removed, and thereby the image is also filtered. The brightness progression in the result image obtained is constant and can be differentiated, as compared with the raw image, and the image contrast is improved, so that an object contained in the raw image stands out more distinctly and clearly in the result image.

A preferred further development of this method according to the invention for image processing is characterized in that in step a), the image data of the scene are collected in more than one electromagnetic wavelength range, in order to thereby obtain raw images of the scene in different spectral ranges; that steps b) and c) are performed for all the raw images of the scene, in order to obtain result images of different spectral ranges, and that the result images of the different spectral ranges are combined to form a multi-spectral result image by means of superimposition.

Recording the scene in different spectral ranges by means of sequentially recording images using narrow-band (e.g. 20 nm) filters and combining the raw images of these different spectral ranges, processed according to the invention, in each instance, to form a multi-spectral result image, improves the informational value of the image result obtained.

This is particularly the case if the individual result images of different spectral ranges are combined in monochrome manner, colored with different colors, to produce the multi-spectral result image. A multi-spectral image having filters selected to match the temperature of the body being observed (e.g. 2300° K) on the short-wave flank of the black-body radiation curve can be used to convert the multi-spectral color image to a temperature image. This temperature image makes it possible to find a small, stable temperature region within a significantly larger, possibly also locally brighter, greatly fluctuating background brightness field, such as, for example, a rocket jet tail.

It is advantageous, in this connection, if collecting the image data of the scene in the different spectral ranges takes place using different spectral range filters, in rapid sequence, in terms of time, by means of a high-speed camera. As a result, it becomes possible to record almost time-synchronous raw images of the scene, in comparison with the movement of the object being observed, in different spectral ranges, which images differ only insignificantly with regard to the position of the object in the image, because of the extremely short time sequence of the respective recorded images, so that these recorded images can easily be combined by means of superimposition to produce the multi-spectral result image.

A method for automatic object recognition in accordance with exemplary embodiments of the present invention involves an image processing method in which:

recording the scene in step a) is performed at different angles of rotation about the optical axis of the optical device;

for every angle of rotation, a result image is produced according to the steps of the method according to the invention for image processing;

the individual result images are compared with sample images of individual objects stored in an object database; and each sample image having the least deviation from one or more of the result images identifies the object contained in the scene and determines the position of the object in the result image.

By means of this automatic object recognition method, automatic object identification is made possible, using the image processing method according to the invention. Furthermore, the position of the object in the result image can be determined by means of this automatic object recognition method, and thereby a direction vector of the movement of the object (for example, a rocket) can already be predicted with greater accuracy than according to the state of the art, in the case of a single recorded and analyzed scene.

A preferred further aspect of this object recognition method according to the invention is characterized in that determining the position of the object in the result image takes place by means of determining the raster elements of the result image that agree with corresponding raster elements of the sample image.

Exemplary embodiments of the present invention are directed to an observation apparatus for image processing and an observation apparatus configured for carrying out the method according to the invention for automatic object recognition, using the method according to the invention for image processing.

In the two observation apparatuses according to the invention, an embodiment in which the image processing device has an image rasterization module and a raster filter module is advantageous.

In a first variant of the observation apparatus according to the invention, the image rasterization module has a matrix-like arrangement of light guide elements, which are disposed between the optical device and a sensor sensitive to the detected radiation. In this connection, at least part of the light guide elements have a brightness-reducing raster filter element of the raster filter module assigned to them, in each instance. The optical device is configured in such a manner that it depicts the collected image data as a raw image in an entry plane of the image rasterization module, and it is furthermore configured in such a manner that the raw image can be displaced on the entry plane with reference to an entry plane of the image rasterization module. Furthermore, a computer unit is provided, which receives a brightness signal from the sensor, and on which software runs, which implements method step c) as well as other method steps. This advantageous embodiment of the observation apparatus implements the method steps according to the invention in optical-mechanical manner.

When "brightness" is mentioned in this document, the term is not restricted to the spectrum of visible light, but rather also comprises the intensity of radiation in a non-visible spectrum, such as, for example, in the infrared spectrum or in the ultraviolet spectrum, but without being restricted to these.

Alternatively, the method steps according to the invention can also be implemented in software, for which purpose the observation apparatus suitable for this purpose is characterized in that the optical device is followed by an image sensor, that the optical device is configured in such a manner that it depicts the collected image data in a sensor plane of the image sensor, that a computer unit is provided, which receives an image signal from the image sensor, and that software runs in the computer unit, which software implements method steps b) and c), as well as other method steps, wherein the image rasterization module and the raster filter module are configured as a subroutine of the software.

This advantageous embodiment of the observation apparatus implements the method steps according to the invention in optical-electronic manner.

The combined multi-spectral images are put together in the computer unit only after processing of the individual raw images, from a greater number of superimposed processed individual images, which have been recorded in different spectral colors. The combined multi-spectral image then possesses a much better signal-to-noise ratio than the raw images, of preferably above 100, if the number of superimposed individual images is sufficient, by means of averaging over the many individual images.

The combined multi-spectral images are preferably evaluated using a multi-spectral image evaluation and identification method according to FIG. 3 or FIG. 4, in the image evaluation device 25, 125. In this connection, preferably first an observation of the target behavior is undertaken, and, in particular, the number and the path curves of the visible objects are determined. Then a file of all the flight objects and their flight paths is compiled, which permits reliable recognition of all the objects during subsequent measurements and allows extrapolation of their flight paths in the future, particularly calculation of possible strike points of the flight object at the end of the flight path. Furthermore, the behavior of the objects (separation of a rocket stage, ejection of decoys, flight maneuver of a warhead) can be observed and analyzed as a time progression.

The combined multi-spectral images are furthermore subjected, in multi-spectral target image recognition according to FIG. 3 or FIG. 4, to a comparison with a reference target image database that is incorporated and stored in the memory device 29, 129. In this way, the target image recognition can recognize imaged targets as target objects of a specific type, and consequently identify them. The image recognition can work more reliably and with more precise distinction if the added multi-spectral images are subjected to processing in multiple states before they are worked on.

For this purpose, the combined multi-spectral images are first converted to a standardized form, according to the invention, in that at first, the orthogonally vectorially added total brightness is formed for each pixel as the brightness value, and subsequently all the color components are standardized with the total brightness. The total color vector then consists of the brightness and the standardized color values. In this way, a color coordinate system having any desired number of spectral components can be defined, and in this system all the color operations, which are defined only in three colors in the RGB system, can be carried out multi-spectrally.

For all the color components and the brightness of each image pixel, the image processing performs an operation on a digital basis, according to FIG. 2, during which operation the image is simultaneously filtered and made differentiable, in which interference pixels that are still present after averaging by way of multiple images are removed and filtered out, and in which brightness transitions and edges are accentuated, so that the result image becomes sharper, more contrast-rich, and clearer in terms of colors, and can be evaluated more reliably. This is achieved by means of transformation of all the color components and of the brightness component of the standardized image, with the filter matrix of the raster filter 122, which has a size of 5×5 pixels in the example shown, in the apparatus for processing images having a poor signal-to-noise ratio, on a digital basis, according to FIG. 2.

Preferably, the image is also subjected to affine color transformation, in which spectral components that characterize the target are stretched and therefore become easier to evaluate, and non-typical spectral components are compressed. This allows greater separation clarity between true targets and false targets that could be mistaken for true targets, in the case of correlation of the result images with the true target objects hidden in the images, in the image recognition, than without this image processing.

The multi-spectral image recognition can be carried out either using the apparatus for multi-spectral image recognition on an optical basis according to FIG. 3 or, with greater precision, using the apparatus for multi-spectral image recognition on a digital basis according to FIG. 4.

In the case of the apparatus on an optical basis (according to FIG. 3), the telescope 110 produces a real target image of a remote target, having a size of 25×25 pixels, by way of the deflection mirror 112, in the plane 121 of the front surface of the optical 5×5 light-guide bundle of the image recording device 120, which takes up the same surface area as 5×5 pixels of the real target image. The scanning mirror 112 deflects the target image horizontally and vertically, in such a manner that each center pixel of each 5×5 pixel block passes over the center light-guide element of the 5×5 optical light-guide bundle sequentially. The twenty-five values for the 5×5 pixel blocks of each image having a size of 25×25 pixels are stored in the computer unit 126 for all the spectral ranges. This is repeated for twelve rotational positions, over 360° of the 25×25 pixel image. Search ranges of 15×15 pixel blocks from the target images are compared with the reference images being search, having a size of 15×15 pixels, for the value of each center pixel of each 5×5 pixel block, where the differences of the nine coefficient values of input image search range and current reference image, in each instance, are formed. The position and the rotational position at which the smallest difference amount occurs, and at which this amount goes below a predetermined minimal value, is registered as the position and rotational position of a found target of the current reference image class. Image parts that project out of the image field are not taken into consideration. The position resolution of the image recognition amounts to five pixels horizontally and vertically, in this connection.

In the case of the apparatus on a digital basis (FIG. 4), the telescope 110 produces a real target image of a remote, illuminated target having a size of 25×25 pixels, by way of the deflection mirror 112, in the image plane of the image recording device 120 that has an NIR (near-infrared) camera, for example. The camera converts the light signal to a digital multi-spectral image with high resolution. For the multi-spectral image recognition, characteristic values of an evaluation function according to the invention are calculated for every search pixel position in the search image (size 25×25 pixels), as described above. By means of the described formation of the evaluation function, the number of rotational positions to be examined can be limited to twelve, without any loss of separation sharpness.

Using a near-infrared sensor system, which is configured according to one of the aforementioned examples, target detection, flight path tracking, flight path measurement, and target observation and target identification of launched rockets, even after engine shutoff, can be carried out at distances up to 500 km.

Preferred exemplary embodiments of the invention, with additional configuration details and further advantages, will be described in greater detail and explained below, making reference to the attached drawings.

BRIEF DESCRIPTION OF THE DRAWINGS

The drawings show:

FIG. 1A a raster filter matrix of the observation apparatus according to FIG. 1;

FIG. 2A a raster filter matrix of the observation apparatus according to FIG. 2;

PRESENTATION OF PREFERRED EXEMPLARY EMBODIMENTS

Figure 1:
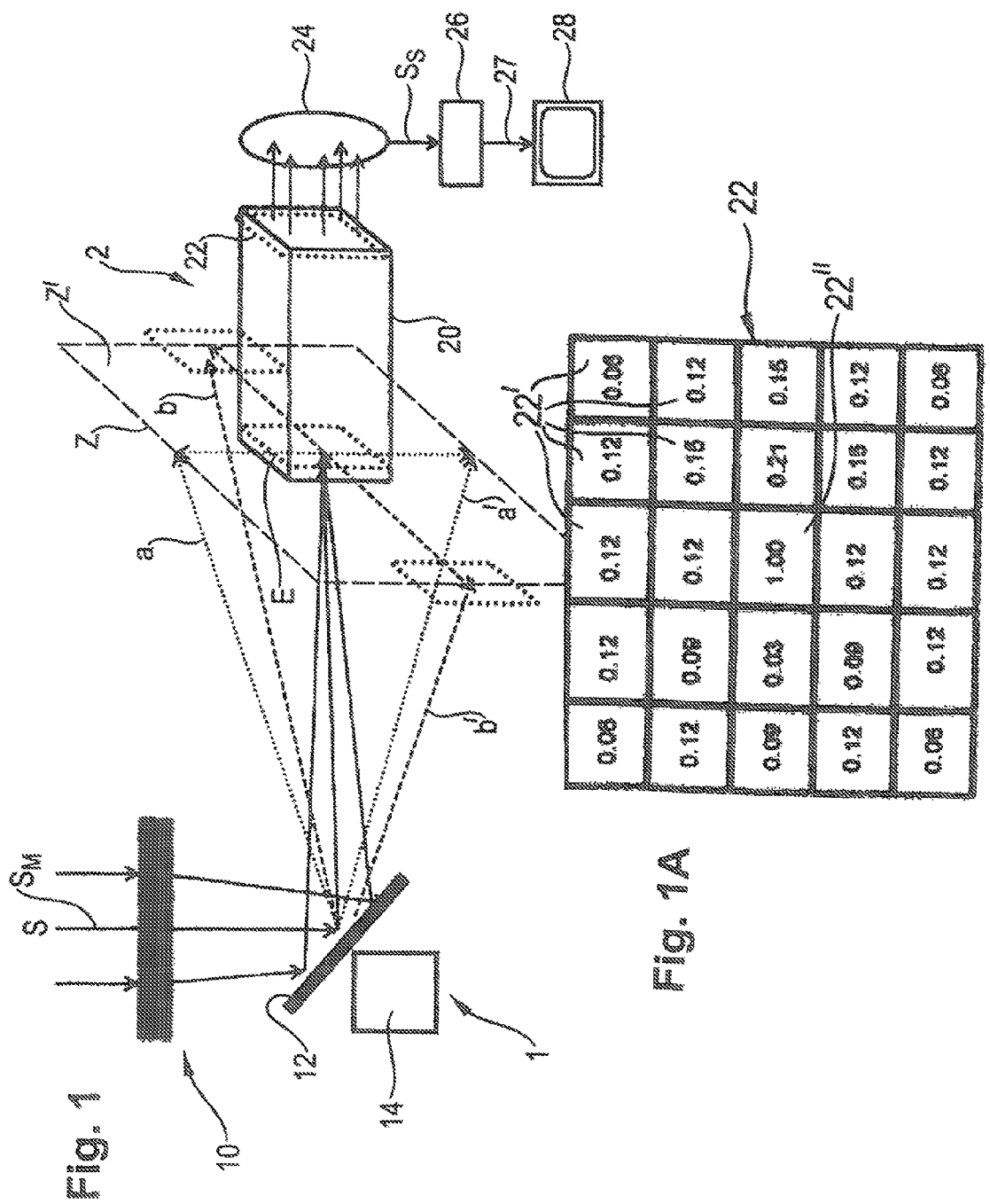
FIG. 1 a schematic representation of a first observation apparatus for carrying out the image processing method according to the invention.

FIG. 1 shows an observation apparatus according to the invention, having an optical device 1 and an image processing device 2. The optical device 1 has a telescope unit 10 having a long-focus lens, which is shown only schematically in the figure. The telescope unit 10 captures electromagnetic radiation S of an observed scene in the visible spectrum of light and outside of the visible spectrum of light (for example infrared and/or ultraviolet radiation).

The radiation S captured by the telescope 10 is passed to a movable deflection mirror 12, which can be driven by a drive 14, shown only schematically in FIG. 1, to carry out a two-dimensional scanning movement. The vertical deflection of the deflection mirror 12 takes place in an angle range that is defined in FIG. 1, as an example, by the upper boundary line a of a center jet $S_M$ and by the lower boundary line a', as well as by a first lateral boundary line b and a second lateral boundary line b' of the center jet $S_M$. In this region Z, spanned by the boundary lines a, a' and b, b', the deflection mirror 12 performs line-by-line scanning of the radiation S captured by the telescope 10, and, in this connection, projects a part of the target image Z' determined by the region Z onto an entry plane E of an image rasterization module 20 of the image processing device 2.

The image rasterization module 20 has a matrix-like arrangement of light-guide elements, not shown in any detail in FIG. 1, which end in the entry plane E with their one end. At the other end of the light-guide elements, a raster filter 22, which is also matrix-like, is provided, which is shown only schematically in FIG. 1 and reproduced as a filter matrix in FIG. 1A, in cross-section. This raster filter 22 contains a central raster filter element 22″ and a plurality of further individual raster filter elements 22′ that surround it, each of which is assigned to a further light-guide element that surrounds the central light-guide element. In the example shown, the image rasterization module 20 therefore consists of five times five (in other words twenty-five) light-guide elements, to each of which a raster filter element 22′, 22″ is assigned.

In FIG. 1A, factors are assigned to a respective further raster filter element 22′, which factors reproduce the light permeability of the individual raster filter element. Accordingly, the central raster filter element 22″, which is assigned to the central light-guide element, possesses a light permeability of 1.00, which corresponds to 100%. The light guided by the central light-guide element is therefore not reduced by the raster filter 22. In contrast to this, the further light-guide elements disposed around the central light-guide element have a light-reducing filter effect applied to them, with the factors indicated in FIG. 1A having the following meaning:

0.03 corresponds to 3% light permeability,
0.06 corresponds to 6% light permeability,
0.09 corresponds to 9% light permeability,
0.12 corresponds to 12% light permeability,
0.15 corresponds to 15% light permeability,
0.21 corresponds to 21% light permeability.

The light emitted by the individual light-guide elements of the image rasterization module 20, through the raster filter 22, impacts a sensor 24, which is formed by a photo light amplifier tube, for example, and which forms the sum signal of the light radiation exiting through the individual raster filter elements. This brightness or radiation intensity sum signal $S_S$ is passed on by the sensor 24 to a computer unit 26 of the image processing device 2.

By means of the scanning movement of the deflection mirror 12, the incident radiation S is thereby detected by the sensor 24, pixel by pixel, and passed to the computer unit 26 as a radiation intensity sum signal $S_S$. In this connection, the sum of the radiation intensities of the neighboring pixels of the matrix shown in FIG. 1A, weighted with the filter factors, is detected by the sensor 24, where the respective target image pixel forms the central element of the matrix. In this connection, a target image pixel corresponds to a raster element of the raster of the light-guide elements or of the raster filter. Therefore, the brightness values of the pixels surrounding the central pixel element (target image pixel), in accordance with the brightness attenuation matrix shown in FIG. 1A, are summarily assigned to each target image pixel, so that in this way, light amplification for the target pixel takes place, weighted in accordance with the light-reducing factors of the matrix.

In the computer unit 26, after a scan of the deflection mirror 12 has been completely performed, all the stored total brightness values of the individual target image pixels are combined into a result image once again, which image is then output to a display device 28, for example, by way of an output interface 27. The formation of the result image from the stored total brightness values of the individual target image pixels takes place in such a manner that the stored total brightness values of a target image pixel are assigned to the same position in the result image that the target image pixel held in the target image.

This output result image is not only brighter than the target image Z' originally projected onto the entry plane E, because of the light amplification as described, but rather, on the basis of the different weighting of the respective neighboring pixels, according to the matrix from FIG. 1A, this result image is also filtered and no longer contains any noise pixels that stand out from the background. As a result, the brightness progression of the result image is constant, so that the result image can be differentiated. The image contrast is furthermore improved by the method described.

It is true that in the example shown, the brightness filter matrix (raster filter 22) is indicated with 5×5 raster filter elements, and the target image Z' spanned by the scanning region is assumed to be 25×25 pixels, but the invention can also be implemented for all other resolutions of the target image and for all other resolutions of the brightness filter matrix or the matrix of light guide elements.

Figure 2:
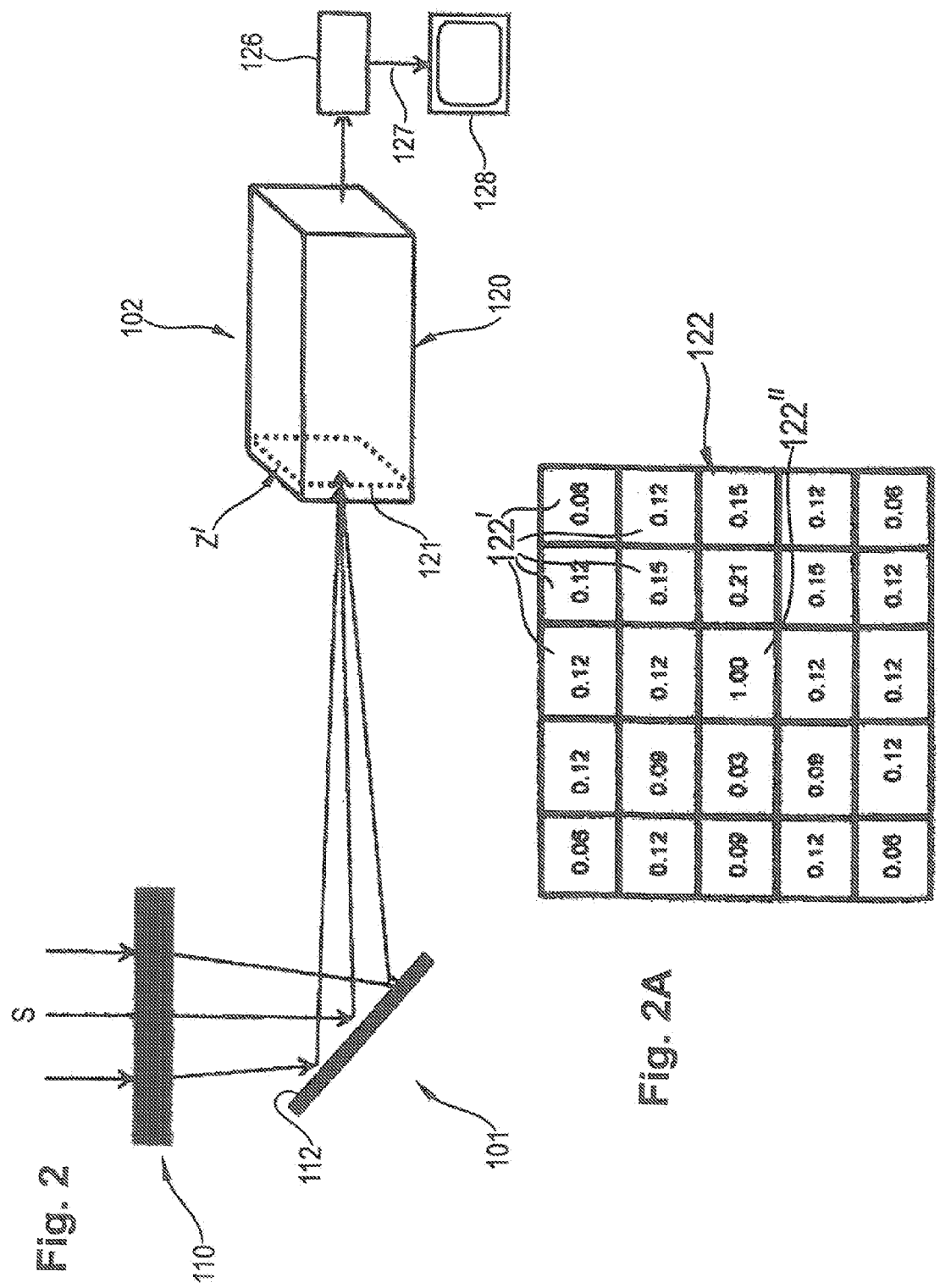
FIG. 2 a second embodiment of an observation apparatus for carrying out the image processing method according to the invention.

In FIG. 2, a modified variant of the observation apparatus shown in FIG. 1 is represented. The radiation S received from the scene to be observed is captured by the telescope unit 110 of the optical device 101 and passed, by means of a deflection mirror 112—which, in contrast to FIG. 1, is not movable—to an image sensor 121 (for example to a CCD sensor) of an image recording device 120, which is an integral part of the image processing device 102, wherein the target image Z' of the observed scene is completely depicted on the image sensor 121.

The image recording device 120 converts the optical target image Z' projected onto the image sensor 121 to a digital image, which is passed on to a computer unit 126 in the form of an image file.

Software that processes the digital image received analogous to the optical image processing method described in connection with FIG. 1 runs in the computer unit 126. In this connection, the recorded target image Z' is converted into a raster image and processed raster element by raster element or pixel by pixel, wherein the brightness value of each target image pixel is determined, and, in accordance with the filter matrix shown in FIG. 2A, which forms a raster filter 122 having the raster filter elements 122', 122" as a software subroutine, added up with the filtered pixels of the pixels of the target image that surround the current target image pixel to form a total brightness value. This formation of a total brightness value is carried out for every target image pixel, and a result image is produced from the individual total brightness values obtained for these electronically rastered target image pixels or target image elements, in analogous manner as described in connection with FIG. 1. The result image is output to a display device 128 by way of the output interface 127.

Although the examples described here relate to the visible light spectrum, they are not restricted to it. In addition to the image processing described here, of scenes recorded in the visible light spectrum, the scenes are also recorded in other spectra, for example in the infrared spectrum and in the ultraviolet spectrum, and processed in the same manner as has been described with reference to FIG. 1 and FIG. 2. The result images of different spectral ranges, obtained in this manner, are superimposed in the computer unit 26, 126 to produce a multi-spectral image that is output by way of the output interface 27, 127.

Figure 3:
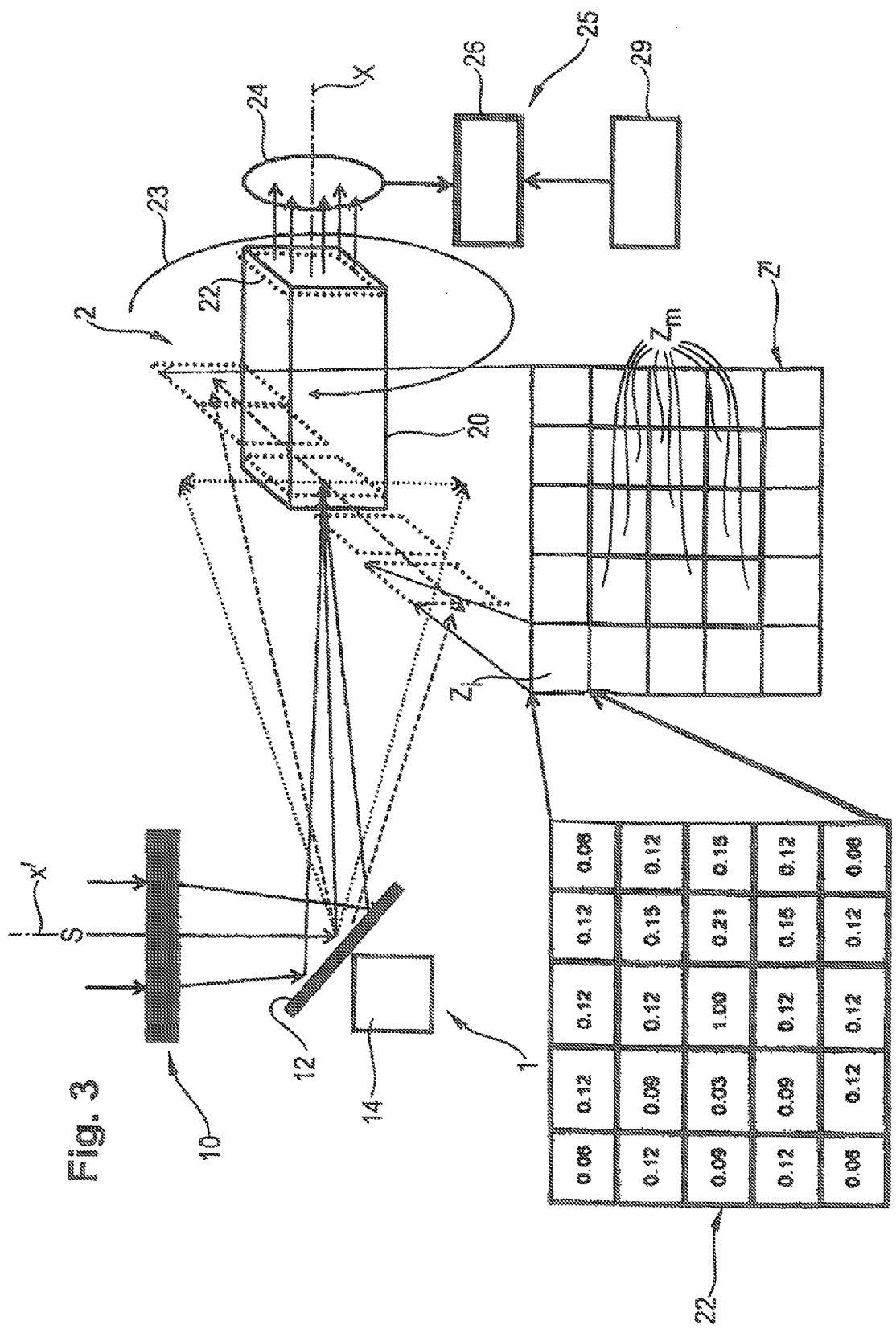
FIG. 3 a first embodiment of an observation apparatus for carrying out the automatic object recognition method according to the invention.

FIG. 3 shows an observation apparatus as already described with reference to FIG. 1. The reference symbols therefore correspond to those from FIG. 1. A significant difference as compared with the embodiment of FIG. 1 consists in that the rasterization module 20 having the light-guide elements can be rotated about an axis of rotation X that runs parallel to the longitudinal direction of the light-guide elements, in predetermined angle steps (for example, 12 angle steps over 360°), as represented symbolically by the arrow 23.

The telescope 10 produces a target image Z' having a size of 25×25 pixels, for example, by way of the deflection mirror 12, which image is represented in FIG. 3 as a matrix with 5×5 fields, wherein each field has the size of 5×5 pixels or raster elements, and therefore possesses the same size and the same number of raster elements as the raster filter 22.

The deflection mirror 12 deflects the radiation captured by the telescope 10 horizontally and vertically, in such a manner that each center pixel of each 5×5 pixel block (=target image element z) is sequentially passed over the central light-guide element of the image rasterization module 20. The brightness values for the twenty-five target image elements $z_i$, resulting in accordance with the image processing described in connection with FIG. 1, are stored in the computer unit 26. In this connection, the image processing preferably takes place not only in the range of visible light, but also analogously for other spectral ranges. The result values for the other spectral ranges are also stored in the computer unit 26.

Then the image rasterization module 20 is rotated one angle step further, and the image processing steps described are repeated. Once this procedure has been carried out for all the angle steps, in other words for a complete rotation of the image rasterization module 20 about the axis X, then a number of result images corresponding to the number of angle steps is obtained in different rotational positions.

The nine inner 5×5 pixel blocks $z_m$ of the target image Z' are now defined as the search image range, and the target image, reduced to these elements $z_m$, is compared with reference images having the same size and the same resolution, stored in a memory device 29. The position and the rotational position at which the smallest difference occurs between the search image and the stored reference image is registered as the position and rotational position of a target of a reference image class contained in the monitored scene.

In this manner, a method for automatic object recognition has been created, using the image processing method described in connection with FIG. 1.

Figure 4:
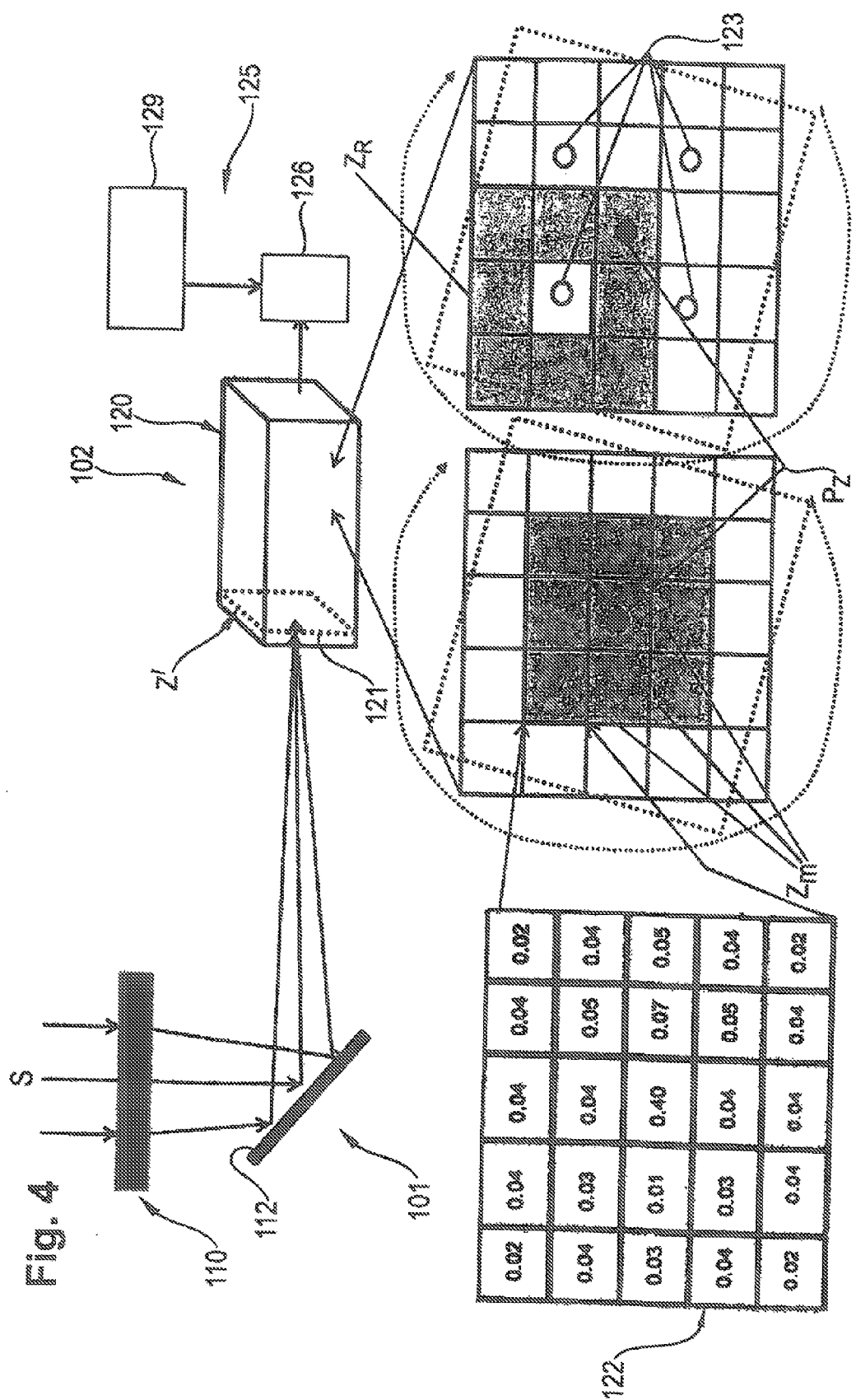
FIG. 4 a second embodiment of an observation apparatus for carrying out the automatic object recognition method according to the invention.

FIG. 4 shows a further variant of an observation apparatus according to the invention, for automatic object recognition. The observation apparatus corresponds, in terms of its structure, to the observation apparatus described in connection with FIG. 2, so that the reference symbols in FIG. 4 are the same reference symbols as in FIG. 2 and therefore refer to the same components. In deviation from the embodiment of FIG. 2, the embodiment of FIG. 4 has a reference image memory in the memory device 129, which stands in connection with the computer unit 126 for data exchange.

The computer unit 26, 126 and the memory device 29, 129 form an image evaluation device 25 within the image processing device 2.

With this apparatus, too, a method for object recognition similar to the method described in connection with FIG. 3 is carried out, wherein in the embodiment of FIG. 4, however, rotation of the target image Z' is carried out virtually, by means of the software that runs on the computer device 126.

For image recognition, preferably multi-spectral image recognition, in the target image Z' (25×25 pixels), the following characteristic values are calculated for every search pixel position $P_Z$:

1) The mean value of the individual standardized spectral components, weighted according to the matrix of the raster filter 122, and the total brightness are calculated for each individual one of the nine marked 5×5 pixel blocks $z_m$ and for all four central pixels 123 of the corner pixel blocks in the central region composed of nine pixel blocks, and, in each instance, the average value of the mean values for the eight 5×5 pixel blocks $z_R$, disposed in a ring, in each instance, which surround a respective corner pixel block, is calculated.

2) The standard deviation of the individual standardized spectral components and of the total brightness is calculated for each one of the nine marked 5×5 pixel blocks $z_m$ and for all four central pixels 123, and, in each instance, the average value of the standard deviations for the eight 5×5 pixel blocks $z_R$, disposed in a ring, in each instance, is calculated.

3) The values according to 1) and 2) are calculated in twelve rotational positions distributed over 360°.

4) Each value set is compared, in each rotational position relating to a search pixel, with the values for the searched reference target image, by means of difference formation, and the value set having the smallest absolute amount of the difference is registered as the representative for this search pixel.

5) The target image is now broken down into smaller partial regions, and the search pixel having the smallest difference amount in each partial region is sought. The value set of the search pixel having the smallest difference amount is interpreted as a recognized target image and registered as a discovered target of the reference target type at the search pixel position being observed, with one pixel resolution and the rotational position.

Reference symbols in the claims, the description, and the drawings serve merely for a better understanding of the invention and are not intended to restrict the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE SYMBOL LIST

The reference symbols refer to:
1 optical device
2 image processing device
10 telescope unit
12 deflection mirror
14 engine
18 display device
20 image rasterization module
22 raster filter
22' raster filter element
22" raster filter element
24 sensor
25 image evaluation device
26 computer unit
27 output interface
28 display device
29 memory device
101 optical device
102 image processing device
110 telescope unit
112 deflection mirror
120 image recording device
121 image sensor
122 raster filter
122' raster filter element
122" raster filter element
125 image evaluation device
126 computer unit
127 output interface
128 display device
129 reference image memory
a boundary line
a' boundary line
b boundary line
b' boundary line
E entry plane
$P_Z$ search pixel position
S electromagnetic radiation
$S_M$ center jet
$S_S$ sum signal
X optical axis
Z spanned region
Z' target image
$z_i$ target image element
$z_m$ pixel block
$z_R$ pixel block

The invention claimed is:

1. A method for image processing, comprising:
a) collecting image data of a scene as electromagnetic radiation using an optical device;
b) processing the image data obtained in step a) using an image processing device to improve the signal-to-noise ratio of the image data, wherein the processing involves
b1) creating a raster image by dividing a raw image that contains the image data into lines and columns;
b2) superimposing a central raster filter element of a raster filter having an odd number of lines and an odd number of columns onto a raster image element;
b3) determining brightness values of each of the raster image elements covered by the raster filter, wherein except for the central raster filter element, every other raster filter element has an individual light-reducing property;
b4) producing a total brightness value by summing the brightness values determined in step b3), and assigning the total brightness value to the raster image element covered by the central raster filter element;
b5) repeating steps b2) to b4) for all remaining raster image elements; and
c) producing a result image, which has a same resolution as a raw image formed by the image data of the scene collected by the optical device, from the total brightness values of the raster image elements obtained in step b).

2. The method of claim 1, wherein
in step a), the image data of the scene are collected in more than one electromagnetic wavelength range to obtain raw images of the scene in different spectral ranges;
steps b) and c) are carried out for all of the raw images of the scene to obtain result images of different spectral ranges, and
the result images of the different spectral ranges are combined by superimposition to produce a multi-spectral result image.

3. The method of claim 2, wherein collecting the image data of the scene in the different spectral ranges is performed using different spectral range filters, in rapid sequence, in terms of time, by a high-speed camera.

4. The method of claim 1, wherein automatic object recognition is performed by
recording the scene in step a) at different angles of rotation about the optical axis of the optical device;
producing a result image for every angle of rotation according steps b1)-b5) and c);
comparing the individual result images with sample images of individual objects stored in an object database, and
wherein the sample image having a least deviation from one or more of the result images identifies the object contained in the scene, and determines the position of the object in the result image.

5. The method of claim 4, wherein determining the position of the object in the result image takes place by determining an agreement of raster elements of the result image with corresponding raster elements of the sample image.

6. The method of claim 1, wherein
the optical device is arranged in an aircraft flying above dense atmosphere, upward, with cold outer space as background, and thereby the sensitivity of system is increased and the susceptibility to interference is reduced,
the optical device is arranged to capture the scene from the side and downward, so that the vision line onto the hot core region of an engine jet is not covered by a body of the rocket or by smoke and exhaust jet behind the rocket,
narrow-band multi-spectral images of the fire jet of the rocket are recorded in at least 3 bands, the spectral ranges of which are coordinated with the temperature of the observed target in such a manner that the temperature distribution in the target image can be calculated very precisely, for example to a precision of 50° K,
the high-temperature range of a core jet is used to track the path of the rocket, which jet is firmly bound to the engine nozzle and is not subject to any fluctuations that could impair measurement accuracy, or
the optical resolution is selected in a size of the nozzle diameter of the rocket, in order to be able to determine a size, a number, and a placement of the rocket engines on the rocket, and to thereby be able to classify the rocket as to its type.

7. An observation apparatus, comprising:
an optical device configured to collecting image data of a scene as electromagnetic radiation; and
an image processing device for improving the signal-to-noise ratio of the collected image data, wherein the image processing device is configured to
b1) create a raster image by dividing a raw image that contains the image data into lines and columns;
b2) superimpose a central raster filter element of a raster filter having an odd number of lines and an odd number of columns onto a raster image element;
b3) determine brightness values of each of the raster image elements covered by the raster filter, wherein except for the central raster filter element, every other raster filter element has an individual light-reducing property;
b4) produce a total brightness value by summing the brightness values determined in step b3), and assigning the total brightness value to the raster image element covered by the central raster filter element;
b5) repeat steps b2) to b4) for all remaining raster image elements; and
wherein a result image, which has a same resolution as a raw image formed by the image data of the scene collected by the optical device, is produced from the total brightness values of the raster image elements.

8. The observation apparatus of claim 7, further comprising:
an image evaluation device configured to
record the scene at different angles of rotation about the optical axis of the optical device;
produce a result image for every angle of rotation according steps b1)-b5) and c);
compare the individual result images with sample images of individual objects stored in an object database, and
wherein the sample image having a least deviation from one or more of the result images identifies the object contained in the scene, and determines the position of the object in the result image.

9. The observation apparatus of claim 7, wherein the image processing device has an image rasterization module and a raster filter module.

10. The observation apparatus of claim 9, wherein
the image rasterization module has a matrix-like arrangement of light-guide elements that are disposed between the optical device and a sensor sensitive to the radiation detected;
at least a part of the light-guide elements has a brightness-reducing raster filter element of the raster filter module assigned to it;
the optical device is configured to depict the collected image data in an entry plane of the image rasterization module, as a raw image;
the optical device is configured to displace the raw image on an entry plane, with reference to the entry plane of the image rasterization module;
a computer unit is provided, which receives a brightness signal from the sensor; and
the computer unit executes software to produce the result image.

11. The observation apparatus of claim 9, wherein
an image sensor follows the optical device;
the optical device is configured to depict the collected image data in a sensor plane of the image sensor;
a computer unit is provided, which receives an image signal from the image sensor; and
the computer unit executes software to perform the signal-to-noise ratio improvement processing; and
the image rasterization module and the raster filter module are configured as a subroutine of the software.

* * * * *